April 10, 1928.  1,665,498

L. E. HENDEE

DEAD END BRACKET

Filed July 14, 1924

WITNESSES
George Mueller.
M. E. Downey.

INVENTOR.
Lem E. Hendee
By R. S. Caldwell
ATTORNEY.

Patented Apr. 10, 1928.

1,665,498

UNITED STATES PATENT OFFICE.

LEM E. HENDEE, OF MILWAUKEE, WISCONSIN, ASSIGNOR TO LINE MATERIAL COMPANY, OF SOUTH MILWAUKEE, WISCONSIN, A CORPORATION OF WISCONSIN.

DEAD-END BRACKET.

Application filed July 14, 1924. Serial No. 725,954.

The invention relates to brackets for dead ending line wires.

An object of the invention is to provide a dead end bracket of simple and inexpensive pressed metal construction, capable of withstanding heavy loads without distortion.

Another object of the invention is to facilitate the installation and retention of the bracket on a cross-arm or other support.

The invention further consists in the several features hereinafter set forth and more particularly defined by the claim at the conclusion hereof.

Figure 1:
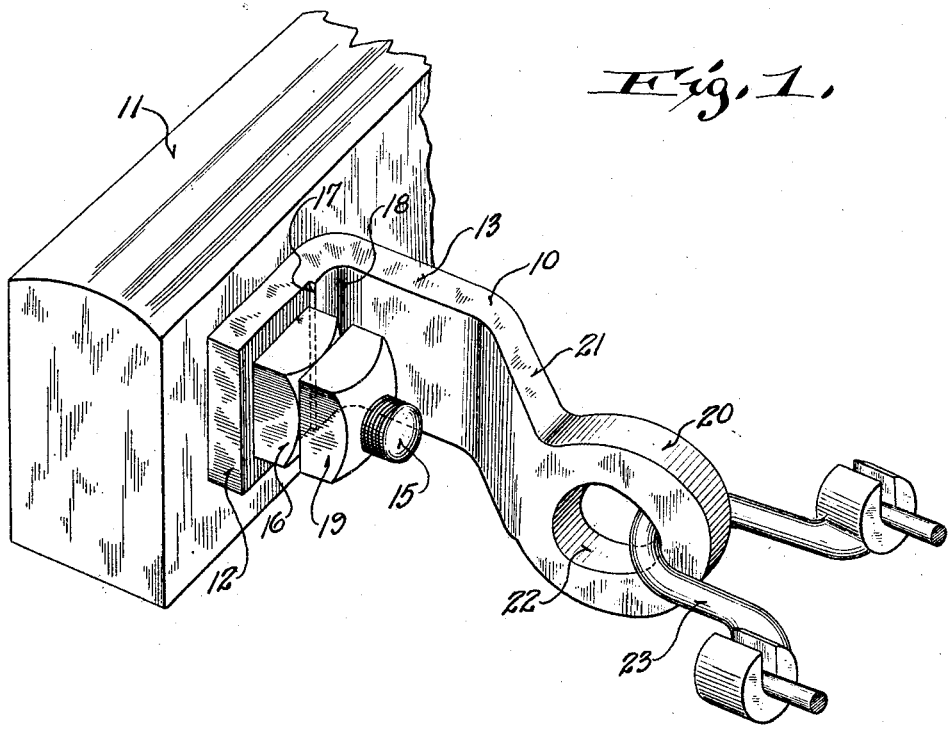
Figure 2:
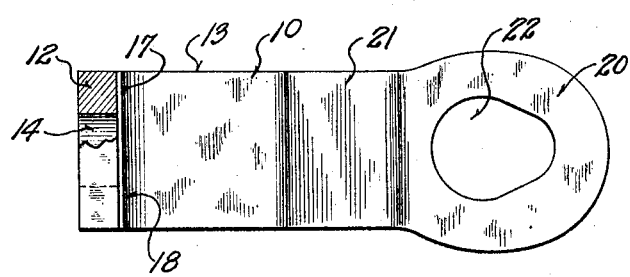

In the drawings: Fig. 1 is a perspective view of a dead end bracket embodying the invention installed on a cross-arm, and Fig. 2 is a side view of the bracket, parts being broken away and parts being shown in section.

In the drawings, 10 indicates a bracket embodying the invention and 11 a cross-arm on which it is mounted. The bracket is formed to shape by suitable dies from a piece of flat bar stock and comprises a base portion 12 and a clevis supporting portion 13 extending outwardly from one side of the base portion. The base portion is provided with an opening 14 to receive a bolt 15 which passes through the cross-arm with its threaded end preferably adjacent the bracket. A nut 16 is threaded onto the bolt and is held from turning with respect to the bracket by its engagement with a shoulder 17 extending transversely of the base portion or by its engagement with the fillet 18 at the junction of the base portion and clevis-supporting portion, in which case the shoulder can be dispensed with.

After the bolt has been drawn up to clamp the bracket firmly against the cross-arm, as by turning the nut 16 with the bracket, a lock nut 19 is drawn up against the nut 16 to prevent loosening of the bolt, the fillet 18 being of sufficient radius to permit the corners of the nut 19 to pass the clevis-supporting portion of the bracket.

The outer end 20 of the clevis-supporting portion 13 is offset with respect to the part adjacent the base portion by an obliquely disposed part 21 to bring it into substantial alignment with the opening 14 and the bolt 15 which is passed therethrough. The end 20 is provided with an opening 22, preferably of ovoid shape, to receive a clevis 23, which is adapted to support a wire-receiving insulator (not shown) for dead ending purposes. The enlarged rearward end of the opening is adapted to pass the head of the clevis and the reduced forward end prevents shifting of the clevis when in place.

The strain on the clevis is brought directly in alignment with the bolt 15 by the offset disposition of the end of the bracket, which minimizes lateral forces acting to tip the bracket and enables the nut 16 to take the load squarely on its inner face.

The bracket being formed from flat bar stock of the requisite strength and toughness is much more reliable than a cast metal bracket. The configuration of the bracket is obtained by a simple forming operation and affords ready access to the clamping nuts.

What I claim as new and desire to secure by Letters Patent is:

A dead end bracket comprising a base portion having an aperture to receive a threaded attaching member for clamping said base portion against a support and a clevis-supporting portion projecting laterally from one side of said base portion and having an offset terminal clevis-receiving portion, extending in substantially axial alignment with the aperture in the base portion, and a nut threaded on said attaching member and bearing against said base portion, said base portion having a part spaced from said aperture to prevent turning of said nut with respect to the bracket.

In testimony whereof I affix my signature.

LEM E. HENDEE.